United States Patent [19]
Modly

[11] 3,956,007
[45] May 11, 1976

[54] ANTIMONY-FREE YELLOW PIGMENTS AND THEIR PREPARATION
[75] Inventor: Zoltan M. Modly, Shaker Heights, Ohio
[73] Assignee: Kewanee Oil Company, Bryn Mawr, Pa.
[22] Filed: Jan. 27, 1975
[21] Appl. No.: 544,441

[52] U.S. Cl. .......................... 106/300; 106/288 B; 106/39.8
[51] Int. Cl.² ........................................ C09C 1/36
[58] Field of Search ............. 106/288 B, 300, 39.8

[56] References Cited
UNITED STATES PATENTS
3,022,186   2/1962   Hund .............................. 106/288 B FOREIGN PATENTS OR APPLICATIONS
384,473   12/1932   United Kingdom ............. 106/288 B

*Primary Examiner*—Winston A. Douglas
*Assistant Examiner*—John P. Sheehan
*Attorney, Agent, or Firm*—Richard M. Howell

[57] ABSTRACT

A new antimony-free yellow pigment is prepared by calcining anatase titanium dioxide with a limited quantitative combination of nickel, tungsten, zinc, lithium, cerium and magnesium compounds.

10 Claims, No Drawings

ANTIMONY-FREE YELLOW PIGMENTS AND THEIR PREPARATION

BACKGROUND OF THE INVENTION

Metal oxide pigments are used widely for colorants in the paint, plastics and ceramics industries and are principally known for their chemical, thermal and weathering stabilities. Stable metal oxide pigments are produced by calcining simultaneously an intimate mixture of oxides or oxide precursors of primarily transition metals. In some cases the major component is a white pigment such as titanium dioxide which accepts minor additions of intensely colored metal ions to produce pastel colorants. A large number of such systems is disclosed in U.S. Pat. No. 3,022,186.

A previously known commercial pastel yellow pigment was made as a solid solution by incorporating antimony and nickel, as oxides or oxide precursors, as guest components in a titanium dioxide host lattice. It should be noted that nickel by itself (without the addition of antimony) does not form the yellow color complex in the titanium dioxide but results in a pale color.

However, much emphasis has been made of the suspected health hazards of pigments containing certain metals such as antimony, arsenic, bismuth, cadmium, selenium mercury and soluble barium. Consequently, it is desirable to produce an antimony-free pigment having the same qualities as the peviously known antimony-containing pigment.

While the same basic pigment compositions are used by such varied industries as the paint, plastics and ceramics industries to color a variety of media ranging from complex organic polymers to glass, it is necessary to adjust the physical properties of each pigment to meet the special specifications for its successful commercial application. For example, a ceramic pigment is usually composed of relatively coarse particles to minimize dissolution in the strongly alkaline glazes thereby to maintain color intensity. Conversely, the paint and plastics industries prefer pigments in a relatively finely divided state to permit easy dispersion and optimize such properties as gloss, brightness, strength and opacity, The standard preparation of metal oxide pigments consists of calcining an intimate mixture of metal oxides or oxide precursors. Color properties develop from the formation of solid solutions. The above-noted patent U.S. Pat. No. 3,002,186 discloses solid solutions resulting from a large number of combinations of metal oxides or fluorides as guest components in a number of host lattices, principally rutile titanium dioxide. Examples 3, 8, and 9 of that reference show specifically various yellow solid solutions incorporating each of a combination of zinc oxide and tungsten oxide, a combination of nickel oxide and tungsten oxide and a combination of nickel oxide, tungsten oxide and sodium fluoride in a titania lattice. Pigments prepared as disclosed therein possess the desired color properties but are deficient in such physical characteristics as texture, i. e. ease of dispersibility, gloss and opacity necessary for commercial use in the paint and plastics industries. It should be noted that other titania-based yellow pigment compositions are disclosed in the reference, but they contain such additional metals as antimony, bismuth, uranium, tantalum copper, columbium (niobium), iron, arsenic, aluminum, lithium and magnesium. In addition, pigment compositions based on a non-titania host lattice are shown. A number of metals are specifically excluded, including cerium. It is desirable to produce an antimony-free pigment which also has the necessary texture, gloss and opacity for commercial use in the paint and plastics industries.

In addition to other factors, color intensity of pigments is directly proportional to calcination temperature and time. However, elevated temperatures promote sintering, an adverse process whereby the solid particles present become smooth, adhere to one another and densify to form large hard aggregates unsuitable for use as pigments in the paint and plastics industries. Thus, it is desirable to produce antimony-free pigments having the above desired properties while being relatively unsusceptable to sintering during calcination.

SUMMARY OF THE INVENTION

This invention is a new class of yellow pigments consisting essentially of a solid solution of (A) 55 to 95, preferably 75 to 85, weight percent of titanium dioxide, at least 99.5 percent of which has the rutile crystal structure and any remaining has the anatase crystal structure, said titanium dioxide containing in its structure, based on the total weight of solid solution, (B) 1 to 35, preferably 4 to 15, weight percent nickel, preferably in the divalent state, (C) 1 to 25, preferably 2.5 to 9, weight percent tungsten, (D) 0.1 to 20, preferably 1 to 7, weight percent zinc, (E) 0.1 to 15, preferably 0.6 to 1.4, weight percent tetravalent cerium, (F) 0.1 to 20, preferably 1.5 to 2.5, weight percent magnesium and (G) 0.01 to 5, preferably 0.05 to 0.1, weight percent lithium.

This invention also consists of the method for the preparation of the pigments of this invention, said method consisting essentially of (1) intimately mixing anatase titanium dioxide with the oxides or oxide precursors of metals (B), (C), (D), (E), (F) AND (G), all of said ingredients having maximum particle sizes no greater than about 10 microns and 95 weight percent of said ingredients having particle sizes less than 5 microns, (2) heating said mixture to 800° to 1200°C., preferably 1000° to 1050°C., (3) hold said mixture at such temperature for 1 to 6 hours, preferably at least about 3 hours, (4) cool the resulting product and (5) grind the resulting pigment.

DESCRIPTION OF THE PREFERRED EMBODIMENTS

The host element (A) of the pigment compositions of this invention is titanium dioxide which is mixed in the anatase grade or crystal structure but which changes to a rutile crystal structure after calcination to solid solution. The titanium dioxide must have particles no greater in size than about 1.50 microns, preferably no grearer than about 1.0 micron, and, as a practical matter, at least 0.25 micron to achieve satisfactory mixing and calcining to produce an optimum pigment for a given formulation. Such fine particle titania is generally of sufficient purity as commercially available to be satisfactory.

The first guest element (B) is nickel which appears in the solid solution as nickel oxide. The best color is achieved using divalent nickel which is usually admixed as nickelous carbonate which is commercially available. The principal contaminant in any nickel source is cobalt, which has an adverse effect on color purity, intensity and strength. Thus, the cobalt content of any nickel source must be no greater than about 0.5 weight percent, preferably no greater than about 0.1 weight percent, based on the nickel metal present. The nickel source generally is in the form of particles in size no greater than about 2 microns, preferably no greater than about 1 micron, and, as practical matter, at least about 0.5 micron.

The second guest element (C) is tungsten which appears in the solid solution as tungstic oxide but which is usually admixed as tungstic acid, commercially available as pure material. The tungstic acid generally is used in the form of particles having a maximum size of about 5 microns, and, as a practical matter, a minimum size of at least about 1 micron.

The third guest element (D) is zinc which is usually admixed as, and appears in the solid solution as zinc oxide, commercially available as a pure material. The zinc oxide generally is used in the form of particles having a maximum size of about 1.5 microns and, as a practical matter, a minimum size of about 0.5 micron.

The fourth guest element (E) is tetravalent cerium which appears in the solid solution as ceric oxide and which is usually admixed as ceric hydrate, commercially available as a pure material. The ceric hydrate generally is used in the form of particles having a maximum size of about 2 microns and, as a practical matter, a minimum size of about 0.5 micron.

The fifth guest element (F) is magnesium which is usually admixed as and appears in the solid solution as magnesium oxide, commercially available as a pure material. The magnesium oxide generally is used in the form of particles having a maximum size of about 1.5 microns and, as a practical matter, a minimum size of about 0.2 micron.

The sixth guest element (G) is lithium which appears in the solid solution as lithium oxide and which is uaually admixed as lithium carbonate, commercially available as a pure material. The lithium carbonate generally is used in the form of particles having a maximum size of about 10 microns and, as a practical matter, a minimum size of about 1 micron.

The pigment compositions of this invention are prepared by mixing and calcining a mixture of 55 to 95, preferably 75 to 85, weight percent titanium dioxide; 1 to 35, preferable 4 to 15, weight percent nickel; 1 to 25, preferably 2.5 to 9 weight percent tungsten; 0.1 to 20 preferably 1 to 7, weight percent zinc; 0.1 to 15, preferably 0.6 to 1.4, weight percent cerium; 0.1 to 20, preferably 1.5 to 2.5, weight percent magnesium; and 0.01 to 5, preferably 0.05 to 0.2, weight percent lithium. The calcination temperature is generally 800° to 1200°C., preferably 1000° to 1050°C., and the calcination time can be 1 to 6 hours although about 3 hours is usually sufficient.

The following examples illustrate the best presently known method of preparing three typical yellow pigments of this invention. Unless otherwise stated, all quantitative measurements are by weight.

EXAMPLES

Three pre-mixes were prepared with the following compositions:

| Component (parts by weight) | (a) | (b) | (c) | (approximate average particle size micron) |
|---|---|---|---|---|
| Nickel Carbonate (45.48% Ni) | 27.20 | 20.40 | 13.60 | 0.98 |
| Tungstic Acid (72.9% W.) | 5.00 | 10.00 | 10.00 | 3.78 |
| Zinc Oxide (80.3% Zn) | 3.20 | 6.80 | 8.00 | 0.81 |
| Ceric Hydrate (59.6% Ce) | 2.00 | 2.00 | 2.00 | 1.28 |
| Magnesium Oxide (60.3% Mg) | 4.00 | 4.00 | 4.00 | 0.41 |
| Lithium Carbonate (18.8% Li) | 0.40 | 0.40 | 0.40 | 7.10 |
| | 41.80 | 43.60 | 38.00 | |

The components for each pre-mix were placed in a jar having a metal lid equipped with a Waring Blender cutter blade assembly in which the metal blades had been replaced with Teflon blades, and each pre-mix was mixed at high speed for three minutes.

Three final mixes A, B and C were prepared by mixing three portions of 24.00 parts of anatase, titanium dioxide (about 0.55 micron particle size) with 10.45 parts of pre-mix (a), 10.90 parts of pre-mix (b) and 9.50 parts of pre-mix (c) respectively, resulting in the final compositions:

| Components (%) | A | B | C |
|---|---|---|---|
| Titanium Dioxide | 81.22 | 78.71 | 80.29 |
| Nickel | 10.42 | 7.58 | 5.16 |
| Tungsten | 3.08 | 5.97 | 6.09 |
| Zinc | 2.17 | 4.72 | 5.39 |
| Cerium | 1.01 | 0.98 | 1.00 |
| Magnesium | 2.03 | 1.97 | 2.00 |
| Lithium | 0.07 | 0.07 | 0.07 |
| | 100.00 | 100.00 | 100.00 |

Each of the final mixes was mixed for 3 minutes at high speed on the above described mixer, then heated in a clay sagger to 1025°C. over a period of 6 to 7 hours and held at 1025°C. for 3 hours. When the heating was completed, the calcined mixes were allowed to cool to room temperature and were ground to a fine powder with a glass mortar and pestle. All three products had greater than 99.5% rutile crystal structure and less than 0.5% anatase structure. Each of the three products was used as a pigment in an oleoresinous system, namely an alkyd resin based paint, at a level of 15percent pigment volume concentration and a dry film thickness of 8 mils.

Color characteristics were determined spectrophotometrically by matching the reflected light of a colored sample with corresponding proportions of the pure spectrum colors of red, green and blue. These colors are usually designated by the CIE determination as X, Y and Z or tristimulus values. An indication of the color can be obained by converting the X, Y and Z values to chromaticity coefficients $(x,y,z)$ and then plotting x and y on a special two dimensional chromaticity diagram to obtain the dominant wavelength of the color and its relative percent purity. These values correlate more nearly with the visual aspects of hue and chroma.

Final mix A produced a golden yellow pigment identified by a dominant wavelength of 575.7 nanometers (NM) and by an excitation purity of 61.3%.

Final mix B produced a lemon yellow pigment identified by a dominant wavelength of 574.7 NM and by an excitation purity of 61.1%.

Final mix C produced a primrose yellow pigment identified by a dominant wavelength of 573.5 NM and by an excitation purity of 55.9%.

For the purposes of this invention the pigment compositions of this invention should have a dominant wavelength in the range of 571 to 578 NM, preferably about 573 to 576, with an excitation purity ranging from about 55 to 68%, preferably about 58 to 67%. It appears that the color intensity and purity are primarily affected by the relative amounts of nickel, tungsten and zinc, shade variation depending primarily on the relative amount of zinc, whereas the magnesium, cerium and lithium components appear to have beneficial effects on the texture, gloss and opacity of the resulting pigment. The lithium component also specifically permits calcination of the pigment mixtures at least 100°C. lower temperature than otherwise possible thereby reducing the chance of sintering without sacrificing the color intensity.

The pigment compositions of this invention are useful in molding compositions, preferably resin-based, as well as coating compositions because of their inertness, stability and lack of toxicity.

I claim:

1. A yellow pigment composition having a dominant wavelength in the range of about 571 to 578 NM and an excitation purity in the range of about 55 to 68% by the CIE determination, said pigment consisting essentially of a solid solution of (A) 55 to 95 weight percent titanium dioxide, at least 99.5 percent of which has the rutile crystal structure and any remaining has the anatase crystal structure, said titanium dioxide containing in its structure (B) 1 to 35 weight percent nickel, (C) 1 to 25 weight percent tungsten, (D) 0.1 to 20 weight percent zinc, (E) 0.1 to 15 weight percent cerium, (F) 0.1 to 20 weight percent magnesium and (G) 0.01 to 5 weight percent lithium, said weight percentages being based on the total weight of solid solution.

2. A pigment composition in accordance with claim 1 wherein component (B) is divalent nickel and component (E) is tetravalent cerium.

3. A pigment composition in accordance with claim 2 wherein there is 75 to 85 weight percent of component (A), 4 to 15 weight percent of component (B), 2.5 to 9 weight percent of component (C) 1 to 7 weight percent component (D), 0.6 to 1.4 weight percent component (E), 1.5 to 2.5 weight percent component (F) and 0.05 to 0.1 weight percent component (G).

4. A pigment composition in accordance with claim 3 wherein said composition has a dominant wavelength in the range of about 573 to 576 NM and an excitation purity in the range of about 58 to 67%.

5. The method for preparation of a yellow pigment composition having a dominant wavelength in the range of about 571 to 578 NM and an excitation purity in the range of about 55 to 68% by the CIE determination, said method consisting essentially of:
   1. intimately mixing (A) 55 to 95 weight percent anatase titanium dioxide with (B) 1 to 35 weight percent nickel, (C) 1 to 25 weight percent tungsten, (D) 0.1 to 20 weight percent zinc, (E) 0.1 to 15 weight percent cerium, (F) 0.1 to 20 weight percent magnesium and (G) 0.01 to 5 weight percent lithium, said components (B), (C), (D), (E), (F) and (G) being incorporated as oxides or oxide precursors of said components, all of components (A), (B), (C), (D), (E), (F) and (G) being employed as solids having maximum particle sizes no greater than 10 microns and at least 95 weight percent of said solids having particle sizes less than 5 microns, said weight percentages being based on the total weight of yellow pigment product;
   2. heating said mixture to a temperature and for a time sufficient to accomplish solid state diffusion without significant sintering of said mixture;
   3. cooling the resulting product to ambient temperature; and
   4. grinding the resulting product.

6. The method of claim 5 wherein said step (2) is accomplished by heating said mixture to 800° to 1200°C. and holding said mixture in such temperature range for 1 to 6 hours.

7. The method of claim 6 wherein said step (2) is accomplished by heating said mixture to 1000° to 1050°C. and holding said mixture in such temperature range for at least 3 hours.

8. The method of claim 7 wherein component (B) is divalent nickel and component (E) is tetravalent cerium.

9. The method of claim 8 wherein there is 75 to 85 weight percent of component (A), 4 to 15 weight percent of component (B), 2.5 to 9 weight percent of component (C), 1 to 7 weight percent component (D), 0.6 to 1.4 weight percent component (E), 1.5 to 25. weight percent component (F) and 0.05 to 0.1 weight percent component (G).

10. The method of claim 9 wheren said yellow pigment composition has a dominant wavelength in the range of about 573 to 576 NM and an excitation purity in the range of about 58 to 67%.

* * * * *